United States Patent
Honda et al.

(10) Patent No.: US 9,302,640 B2
(45) Date of Patent: Apr. 5, 2016

(54) SEAT APPARATUS FOR VEHICLE

(71) Applicant: Aisin Seiki Kabushiki Kaisha, Kariya (JP)

(72) Inventors: Isao Honda, Chiryu (JP); Yoshiaki Tomatsu, Toyoake (JP); Yusuke Takahashi, Toyota (JP); Tomomi Tomizawa, Nisshin (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/533,212

(22) Filed: Nov. 5, 2014

(65) Prior Publication Data
US 2015/0127225 A1    May 7, 2015

(30) Foreign Application Priority Data
Nov. 7, 2013   (JP) .................. 2013-230804

(51) Int. Cl.
*B60R 21/015*   (2006.01)
*B60N 2/00*   (2006.01)

(52) U.S. Cl.
CPC .......... *B60R 21/01512* (2014.10); *B60N 2/002* (2013.01); *B60R 21/01516* (2014.10)

(58) Field of Classification Search
None
See application file for complete search history.

(56) References Cited

U.S. PATENT DOCUMENTS 6,922,152 B2   7/2005   Sumi et al.
8,328,276 B2   12/2012  Inayoshi et al.

FOREIGN PATENT DOCUMENTS

| JP | 2006-38715 | 2/2006 |
| JP | 3916475 | 5/2007 |
| JP | 4267836 | 5/2009 |
| JP | 2011-43454 | 3/2011 |

OTHER PUBLICATIONS

U.S. Appl. No. 14/533,242, filed Nov. 5, 2014, Honda, et al.
U.S. Appl. No. 14/551,195, filed Nov. 24, 2014, Honda, et al.

*Primary Examiner* — Thomas Tarcza
*Assistant Examiner* — Garrett Evans
(74) *Attorney, Agent, or Firm* — Oblon, McClelland, Maier & Neustadt, L.L.P.

(57) ABSTRACT

A seat apparatus for a vehicle includes a load detection device placed at a front and a rear of one of a right-left pair of the attachment members so as to be spaced apart from each other, the load detection device measuring a load applied to a seat to distinguish an existence of a passenger and a type of a passenger, a detection influence determination device determining an existence of an influence on a passenger determination performance of the load detection device in a case where a collision load value detected by the load detection device in the case of a collision of the vehicle corresponds to a detected value between a preset first collision load value and a preset second collision load value, and a collision influence alert device outputting an alert in a case where the detection influence determination device determines that the passenger determination performance is influenced.

8 Claims, 9 Drawing Sheets

FIG. 12

Number of times of front collision Nf
Number of times of rear collision Nr

|   | First collision | Second collision | Third collision | Nf+Nr |
|---|---|---|---|---|
| a | Front collision | Front collision |  | 2 |
| b | Front collision | Rear collision | Rear collision | 3 |
| c | Front collision | Rear collision | Front collision | 3 |
| d | Rear collision | Rear collision |  | 2 |

SEAT APPARATUS FOR VEHICLE

CROSS REFERENCE TO RELATED APPLICATIONS

This application is based on and claims priority under 35 U.S.C. §119 to Japanese Patent Application 2013-230804, filed on Nov. 7, 2013, the entire content of which is incorporated herein by reference.

TECHNICAL FIELD

This disclosure generally relates to a seat apparatus for a vehicle.

BACKGROUND DISCUSSION

A known automobile is provided with a seat belt or an airbag as an equipment to secure safety of a passenger. The known automobile includes a function which adjusts a speed of the airbag for deployment and a gas amount of the airbag for deployment and adjusts a pretention of the seat belt by determining whether a passenger is an adult, an infant or a child in accordance with a weight of a passenger to enhance the performance of the seat belt and the airbag. From an aspect of the security of a passenger, it is extremely important to precisely determine a load of a passenger by detecting the weight thereof.

Generally, load sensors (load cells) are placed at four corner positions of a seat frame as an apparatus for detecting the weight of a passenger. By adding the load applied to the load sensors in a longitudinal direction together, the weight of a passenger may be generally obtained. However, the load sensor is configured with a strain gauge affixed to a strain body which bends when the load is applied, and outputs voltage signals which change in response to a changing amount of a resistance value associated with flexural deformation of the strain body in response to the load. The strain body is designed to have intensity high enough to measure the weight of a passenger sensitively and may be abnormally deformed when a large impact is applied to the strain body due to, for example, a collision of the vehicle because an excessive load is applied to the strain body. In those cases, because the detection criteria of the load sensor may include discrepancies, the load sensor cannot measure the weight of a passenger precisely.

A passenger weight measuring device is disclosed in JP4267836B (hereinafter referred to as Patent reference 1). As disclosed in Patent reference 1, the passenger weight measuring device includes a load detection means detecting a load in response to an acceleration velocity applied to a passenger and a seat in response to, for example, a weight of a passenger and a collision of a vehicle. The passenger weight measuring device further includes an abnormal load detection means outputting an abnormal load signal in a case where the abnormal load which is out of a preset load detection range is detected by the load detection means. Accordingly, even if the vehicle has a collision at a low speed with a passenger of higher weight (which is in a case where the abnormal load is applied to the strain body), the weight measuring device precisely determines whether an abnormal load is applied to the vehicle and terminates the control for deploying the airbag in accordance with the weight of a passenger.

A vehicle impact determination device is disclosed in JP2011-43454A (hereinafter referred to as Patent reference 2). The vehicle impact determination device determines that an impact is applied to a vehicle in a tensile direction in a case where a load which is equal to or higher than a predetermined value is detected within a predetermined time after a compression load which is equal to or higher than the predetermined value is detected at a position close to a seat for the vehicle. In a case where the impact is applied to the vehicle due to, for example, a collision of the vehicle, the vehicle impact determination device determines, for example, the impact in response to a phenomenon in which a compression load and a tensile load are applied alternately and consecutively within a predetermined time at a portion close to the seating portion of the seat for the vehicle. The vehicle impact determination device includes an impact alert means for notifying a passenger of the vehicle that the vehicle is impacted when determining, for example, the collision of the vehicle. The passenger weight measuring device disclosed in Patent reference 1 and the vehicle impact determination device disclosed in Patent reference 2 prevent relevant devices which activates in response to an inaccurate detection from operating wrongly in a case where the load detection device may possibly detect an inaccurate value due to the collision of the vehicle.

However, when a passenger parallel parks a vehicle in Europe, a vehicle on a passenger may repeatedly collide with vehicles parked in a front-rear direction to secure a parking space. Usually, in those circumstances, a passenger distinction performance of the load sensor is not influenced because of a minor collision of the vehicle.

However, in those circumstances, the passenger weight measuring device disclosed in Patent reference 1 and the vehicle impact determination device disclosed in Patent reference 2 may indicate an alert (impact influence alert) by detecting the minor collision of the vehicle and may increase a frequency to have a vehicle check-up at a dealer or at a maintenance shop of the vehicle to deal with the alert.

A need thus exists for a seat apparatus for a vehicle which is not susceptible to the drawback mentioned above.

SUMMARY

According to an aspect of this disclosure, a seat apparatus for a vehicle includes a seat, a right-left pair of attachment members configured to be provided on a floor of the vehicle, a fixing member provided at the seat to fix the seat to the attachment members, a load detection device interposed between the fixing member and the attachment members, the load detection device placed at a front and a rear of one of the right-left pair of the attachment members so as to be spaced apart from each other, the load detection device measuring a load applied to the seat to distinguish an existence of a passenger and a type of a passenger, a detection influence determination device determining an existence of an influence on a passenger determination performance of the load detection device in a case where a collision load value detected by the load detection device in the case of a collision of the vehicle corresponds to a detected value between a preset first collision load value and a preset second collision load value, and a collision influence alert device outputting an alert in a case where the detection influence determination device determines that the passenger determination performance is influenced, and the collision influence alert device not outputting the alert in a case where the detection influence determination device determines that the passenger determination performance is not influenced.

BRIEF DESCRIPTION OF THE DRAWINGS

The foregoing and additional features and characteristics of this disclosure will become more apparent from the following detailed description considered with the reference to the accompanying drawings, wherein:

FIG. 12 is a graph showing an example of a detection of the collision load in a case where the collisions are occurred in the same direction consecutively.

DETAILED DESCRIPTION

A first embodiment of a load detection device 10 of a seat apparatus 100 for a vehicle detecting a load of a passenger seated in a seat 1 will be explained with reference of the drawings. Hereinafter, a front-rear direction corresponds to a front-rear direction of the vehicle when a passenger is seated in a seat 1 for the vehicle. A right-left direction corresponds to a right-left direction of the vehicle when a passenger is seated in the seat 1. An upper-lower direction corresponds to an upper-lower direction of the vehicle when a passenger is seated in the seat 1. According to the embodiment, the vehicle corresponds to a vehicle with left-hand steering wheel and the load detection device 10 determines an existence of a passenger seated in a seat of a passenger.

Figure 1:
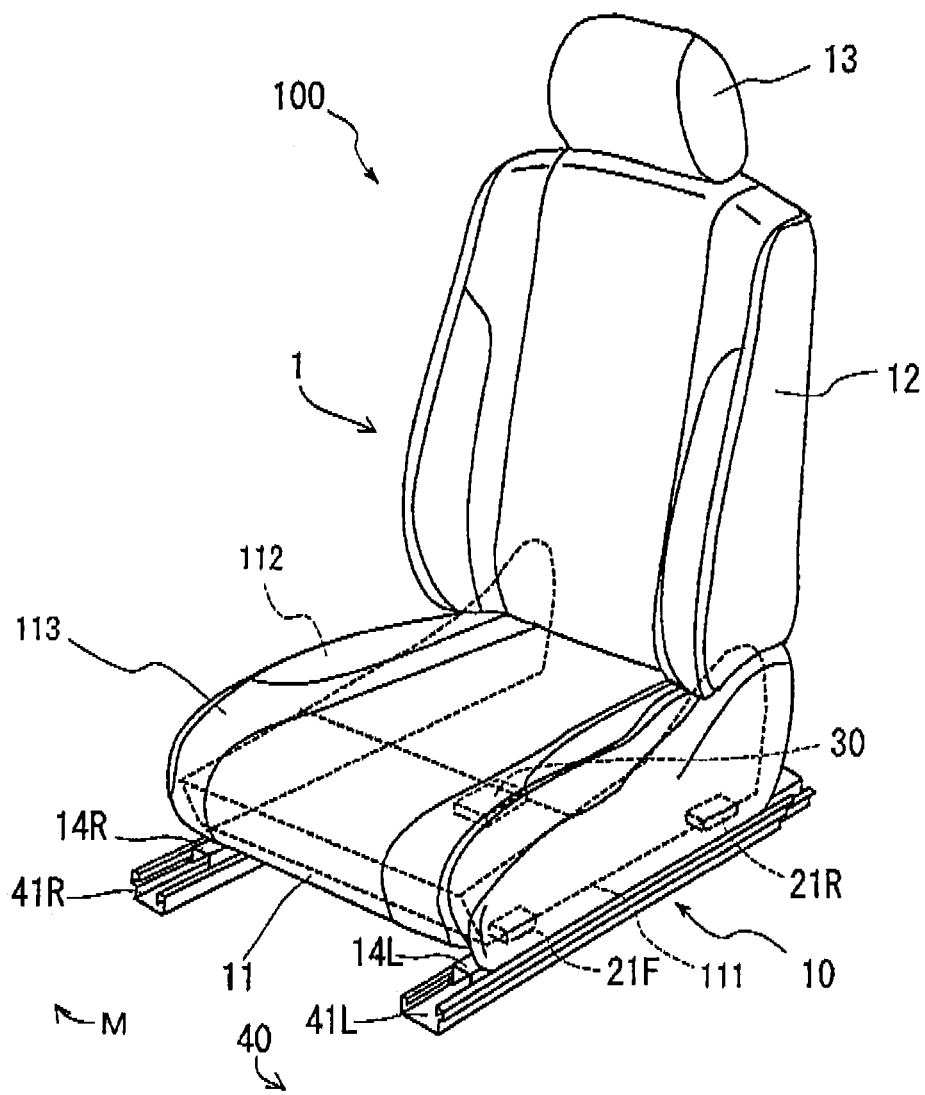
FIG. 1 is a view of a seat apparatus for a vehicle placed at a seat for a vehicle according to an embodiment disclosed here.

As shown in FIG. 1, the seat 1 which corresponds to the seat of a passenger is provided with a seat cushion 11 (i.e., serving as a seat) in which a passenger is seated, and a seatback 12 mounted to a rear end portion of the seat cushion 11 so as to be rotatable in the front-rear direction. The seatback 12 serves as a backrest for a passenger. A headrest 13 is mounted to an upper end of the seatback 12 to support a head of a passenger.

The seat cushion 11 is provided with a seat frame 111 (i.e., serving as a fixing member), a pad member 112 which is positioned on the seat frame 111, and a cover 113 covering a surface of the pad member 112. A right-left pair of upper rails 14R, 14L (i.e., serving as attachment members) is mounted to a lower surface of the seat frame 111. The upper rails 14R, 14L movably engage with a pair of lower rails 41R, 41L (i.e., serving as attachment members), respectively, in the front-rear direction. The pair of lower rails 41R, 41L is fixed on a floor 40 of the vehicle. Accordingly, the seat 1 is formed so as to be movable on the floor 40 of the vehicle in the front-rear direction and be fixed at a position where a passenger desires.

Figure 3:
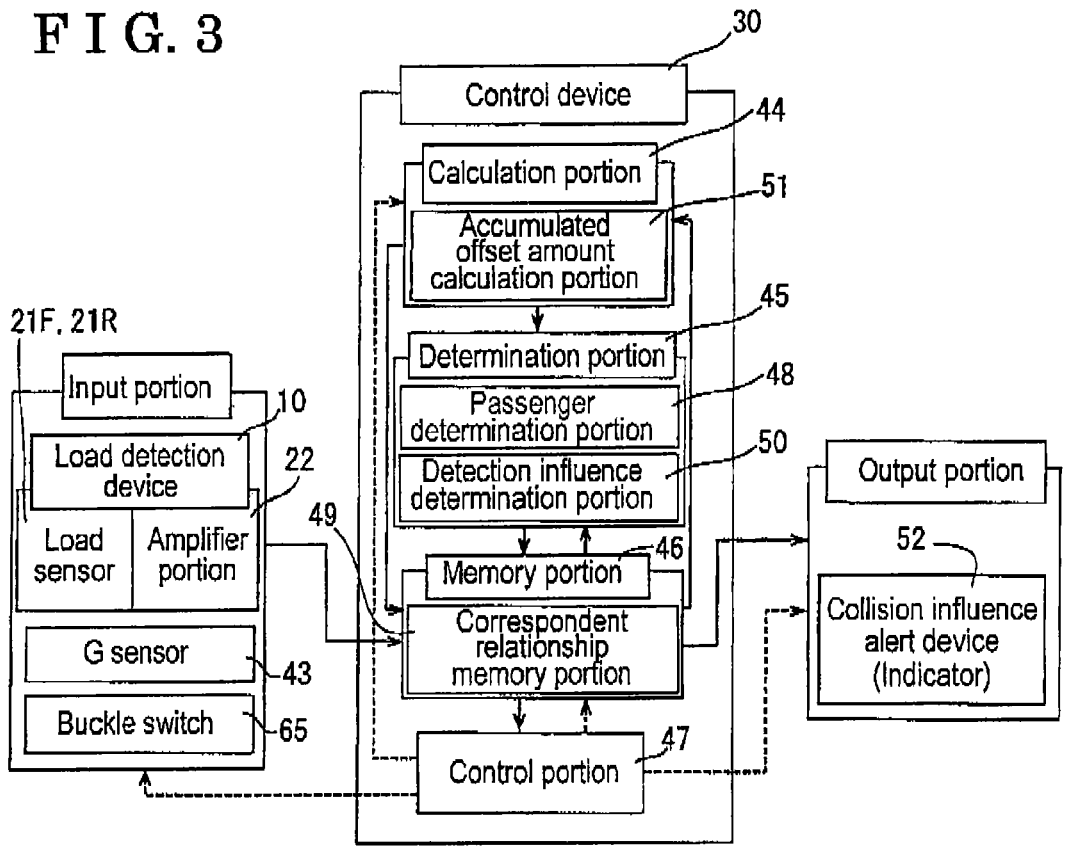
FIG. 3 is a block diagram schematically showing a control system of a first embodiment.
Figure 4:
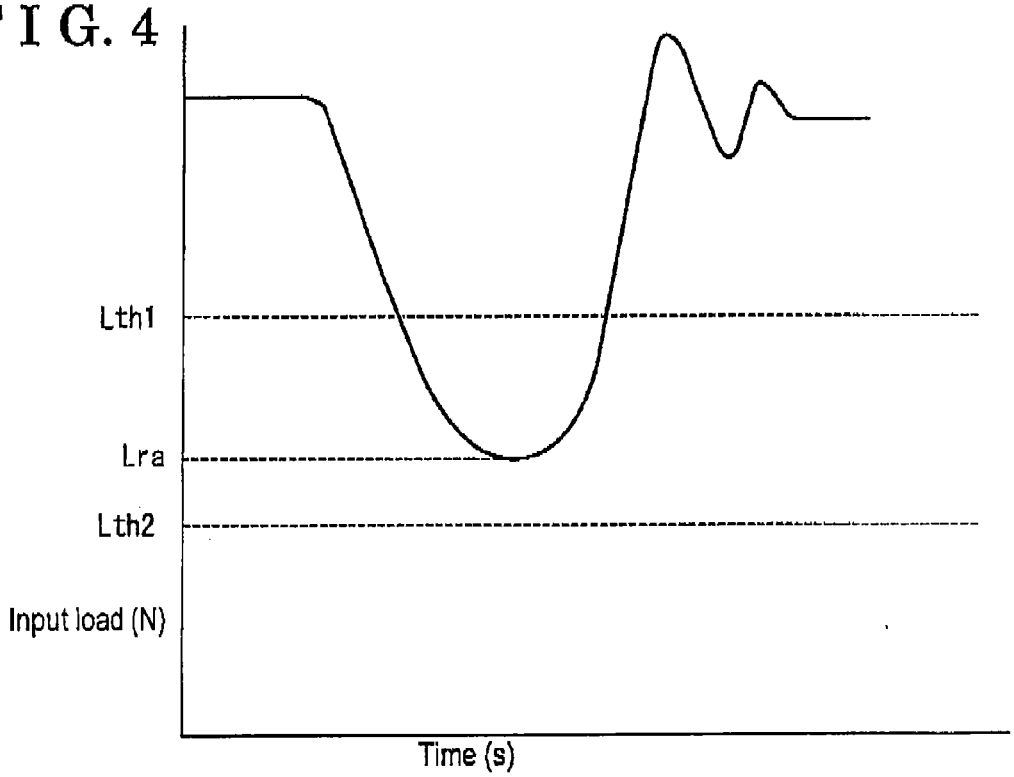
FIG. 4 is a graph showing an example of a detection of a collision load detected by a load detection device in the case of a minor collision.

Next, the construction of the load detection device 10 will be explained. As shown in FIG. 3, the load detection device 10 includes a front load sensor 21F (serving as a load detection device), a rear load sensor 21R (serving as a load detection device) and an amplifier portion 22 which amplifies a detected strain value.

As shown in FIG. 1, the front and rear load sensors 21F, 21R are positioned between the seat frame 111 and the left-side upper rail 14L to be spaced apart from each other at a predetermined distance in the front-rear direction. The front load sensor 21F is placed at a front portion relative to a center of the seat cushion 11 in the front-rear direction, and the rear load sensor 21R is placed at a rear portion relative to a center of the seat cushion 11 in the front-rear direction. The front and rear load sensors 21F, 21R correspond to known load sensors.

The front load sensor 21F is placed between a front portion of the seat frame 111 and the left-side upper rail 14L and detects a front load value Ff applied to a front left side portion of the seat cushion 11. Similarly, the rear load sensor 21R is placed between a rear portion of the seat frame 111 and left-side upper rail 14L and is placed close to a buckle 64 (see FIG. 2) which is supported by the seat 1. The rear load sensor 21R detects a rear load value Rf applied to a rear left side portion of the seat cushion 11.

The front and rear load sensors 21F, 21R output positive detection signals in a case where a load is applied to the seat cushion 11 downwardly when a passenger is seated in the seat 1. The front and rear load sensors 21F, 21R output negative detection signals in a case where a load is applied to the seat cushion 11 upwardly when a passenger is seated in the seat 1. The front and rear load sensors 21F, 21R are zero-adjusted so that each of the load values Ff, Rf remains zero in a state where the vehicle is shipped from a factory.

The load detection device 10 is connected to a control device 30 which is connected by, for example, an indicator 52 (serving as a collision influence alert device) which serves as an output portion.

The control device 30 includes an analog-digital converter or an A/D converter, a calculation portion 44, a memory portion 46, a determination portion 45, and a control portion 47. The A/D converter converts detected analog signals transmitted from the front and rear load sensors 21F, 21R into digital signals. The calculation portion 44 receives detected signals transmitted from the front and rear load sensors 21F, 21R, from a gravity sensor 43, or a G sensor 43, and from a buckle switch 65. The memory portion 46 stores data. The determination portion 45 performs, for example, passenger determination. The control portion 47 controls an input portion, an output portion and the calculation portion 44. The calculation portion 44 includes an accumulated offset amount calculation portion 51 (serving as a detection influence determination device) performing cumulative calculation of offset amounts of the load value from zero, the offset amounts generated due to a minor collision of the vehicle. Hereinafter, the offset amount of the load value from zero detected by the load detection device 10 is referred to as an offset amount.

The determination portion 45 includes a passenger determination portion 48 and a detection influence determination portion 50 (i.e., serving as a detection influence determination device). The passenger determination portion 48 determines the existence of a passenger and a type of a passenger using a total front-rear load value (Ff+Rf) which is obtained by adding the front load value Ff detected by the front load sensor 21F and the rear load value Rf detected by the rear load sensor 21R together. The detection influence determination portion 50 determines the influence on the load detection device 10 which influences on the determination of the passenger determination portion 48 by the collision of the vehicle.

Figure 5:
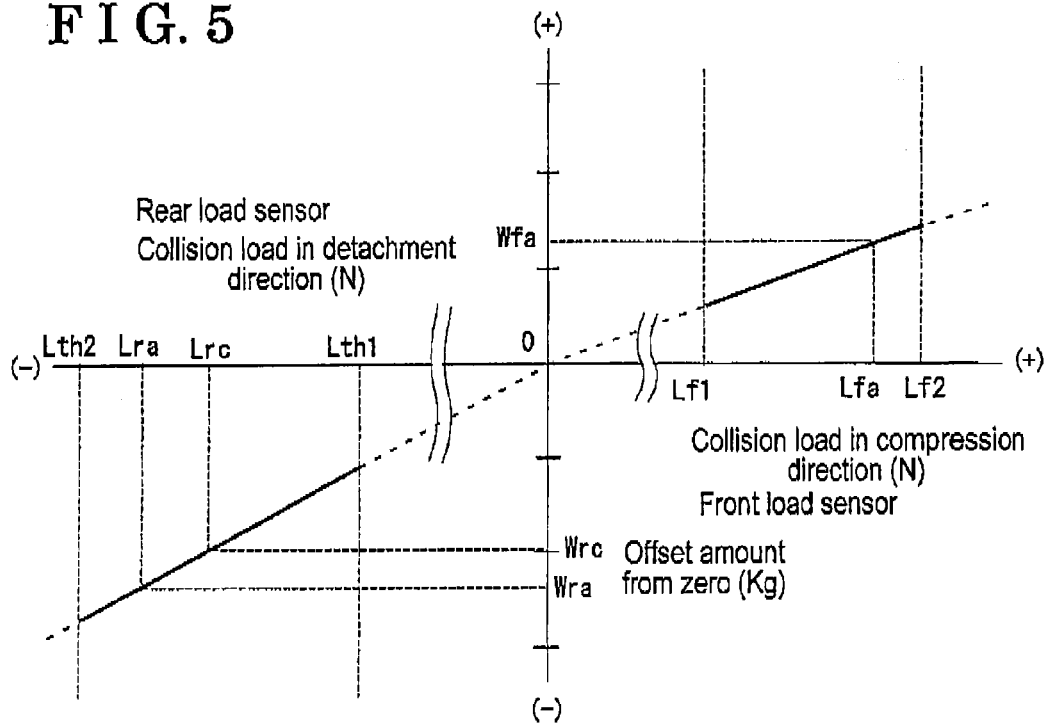
FIG. 5 is a map showing a relationship between an collision load value and an offset amount of the load value from zero in a case where a rear load sensor detects a detected value between a first collision load value and a second collision load value.
Figure 6:
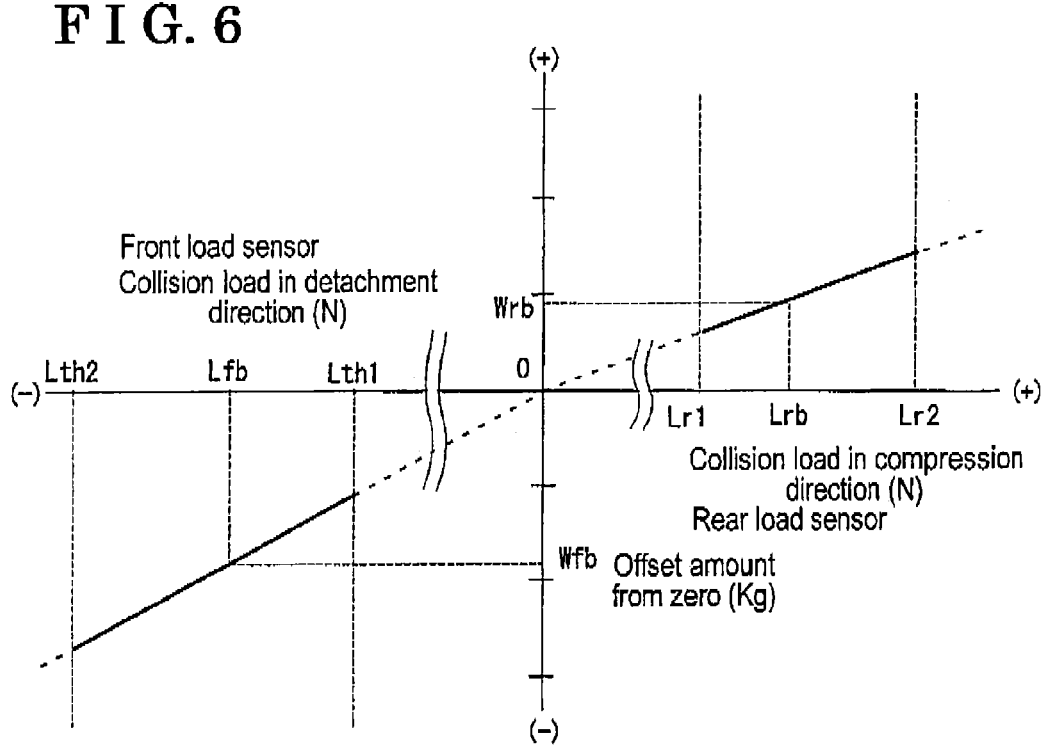
FIG. 6 is a map showing a relationship between an collision load value and the offset amount of the load value from zero in a case where a front load sensor detects a detected value between the first collision load value and the second collision load value.

The memory portion 46 includes a correspondent relationship memory portion 49 (serving as a detection influence determination device) which stores data showing a relationship between the collision load and the offset amount (i.e., the offset amount of the load value from zero detected by the load detection device 10) of the load detection device 10 on maps (see FIGS. 5 and 6). The left lower portion of the graph in FIG. 5 shows a relationship between the collision load value and the offset amount when the collision load is applied to the rear load sensor 21R in a detachment direction of the attachment members (upper rail 14L and lower rail 41L) and the fixing member (the seat frame 111), that is at the time of a front collision of the vehicle. A first collision load value Lth1 and a second load value Lth2 are detected when the collision load is applied in the detachment direction of the lower rail 41L and the seat frame 111. In a case where the collision load is applied to the rear load sensor 21R in the detachment direction of the attachment members (upper rail 14L and lower rail 41L) and the fixing member (the seat frame 111), the right upper portion of the graph in FIG. 5 shows an example of the correspondent relationship between the collision load applied to the front load sensor 21F and the offset amount (i.e., the offset amount of the load value from zero detected by the load detection device 10) of the front load sensor 21F which corresponds to the collision load. That is, in a case where the rear load sensor 21R detects the first collision load value Lth1 in the detachment direction of the attachment members (upper rail 14L and lower rail 41L) and the fixing member (the seat frame 111), for example, a front load value Lf1 is shown as an collision load value detected by the front load sensor 21F in a contracting direction of the attachment members (upper rail 14L and lower rail 41L) and the fixing member (the seat frame 111). In a case where the rear load sensor 21R detects the second collision load value Lth2 in the detachment direction of the attachment members (upper rail 14L and lower rail 41L) and the fixing member (the seat frame 111), for example, a front load value Lf2 is shown as the collision load value detected by the front load sensor 21F in the contracting direction of the attachment members (upper rail 14L and lower rail 41L) and the fixing member (the seat frame 111).

Similarly, the left lower portion of the graph in FIG. 6 shows a relationship between the collision load value and the offset amount when the collision load is applied to the front load sensor 21F in the detachment direction of the attachment members (upper rail 14L and lower rail 41L) and the fixing member (the seat frame 111), that is, at the time of a rear collision of the vehicle. In a case where the collision load is applied to the front load sensor 21F in the detachment direction of the attachment members (upper rail 14L and lower rail 41L) and the fixing member (the seat frame 111), the right upper portion of the graph in FIG. 6 shows an example of the correspondent relationship between the collision load applied to the rear load sensor 21R and the offset amount of the rear load sensor 21R which corresponds to the collision load.

The detection influence determination device is configured with, for example, the detection influence determination portion 50, the correspondent relationship memory portion 49, and the accumulated offset amount calculation portion 51.

The control device 30 receives signals transmitted from the load detection device 10 and the seatbelt attaching detection portion 65 (buckle portion switch) and determines whether the seat 1 is occupied by a passenger or is unoccupied, and whether a passenger is an adult, an infant, or a child by determination processes operated by the passenger determination portion 48. Then, the control portion 47 controls an indicator lamp for the airbag. Further, the accumulated offset amount calculation portion 51 performs cumulative calculation of the offset amounts (i.e., the offset amount of the load value from zero) obtained using the map everytime the vehicle collides. Then, on the basis of the calculation result, the detection influence determination portion 50 determines whether the passenger determination performance of the load detection device 10 is influenced. The control portion 47 controls the indicator 52 to indicate, for example, an alert to urge a passenger to have an early vehicle check-up.

Figure 2:
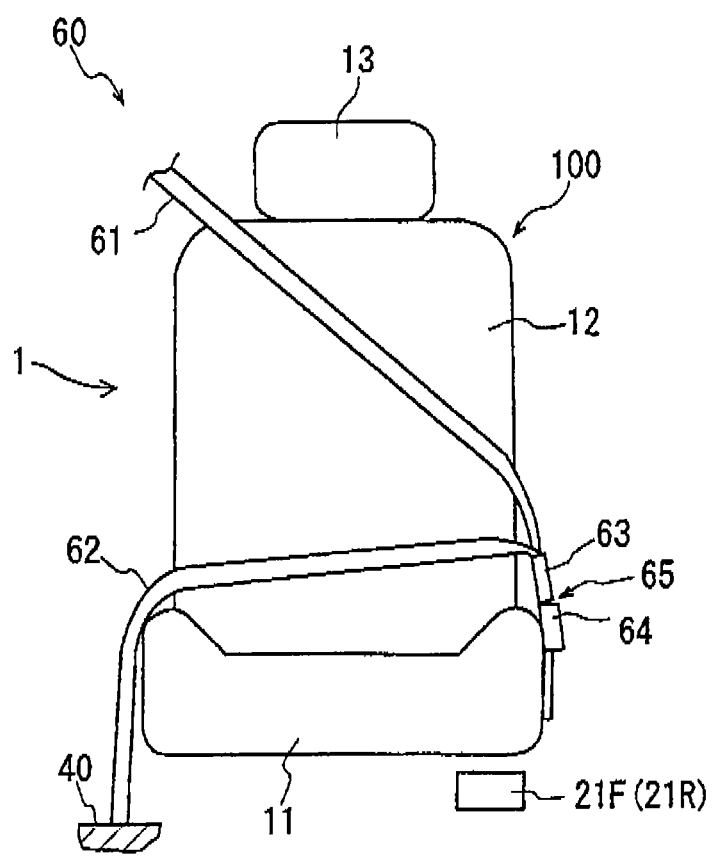
FIG. 2 is a view of the seat apparatus for the vehicle to which a seat belt is attached.

As FIG. 2 shows a front view of the seat device 10 for the vehicle, a seat belt device 60 (a seat belt) includes a shoulder strap 61, a lap strap 62 and the buckle 64. A first end portion of the shoulder strap 61 and a first end portion of the lap strap 62 are connected with each other by a tongue plate 63. The buckle 64 forms the buckle switch 65 by being connected to and disconnected from the tongue plate 63.

A retractor (a winding device) is accommodated inside a pillar portion which is placed at the right side of the seat apparatus 100 for the vehicle. An upper end of the shoulder strap 61 is connected to the retractor and the shoulder strap 61 can be pulled out against a winding force of the retractor.

A second end of the lap strap 62 is fixed to the vehicle floor 40 at the right side of the seat apparatus 100 for the vehicle. The buckle 64 is supported at the left side rear portion of the seat apparatus 100 for the vehicle and includes an opening which opens upward to be inserted by the tongue plate 63. The tongue plate 63 is connected to the shoulder strap 61 and the lap strap 62 and inserts into the opening of the buckle 64 to engage therewith and fixed thereto.

Because the buckle 64 is placed at the same side of the seat apparatus 100 for the vehicle where the front and rear load sensors 21F, 21R are placed, the load detection device 10 can detect not only the weight of a passenger seated in the seat 1 but also the load applied to the buckle 64 downwardly when a passenger wears the seat belt device 60 and the load applied to the buckle 64 upwardly when the seat belt is pulled when a passenger wears the seat belt device 60.

Figure 9:
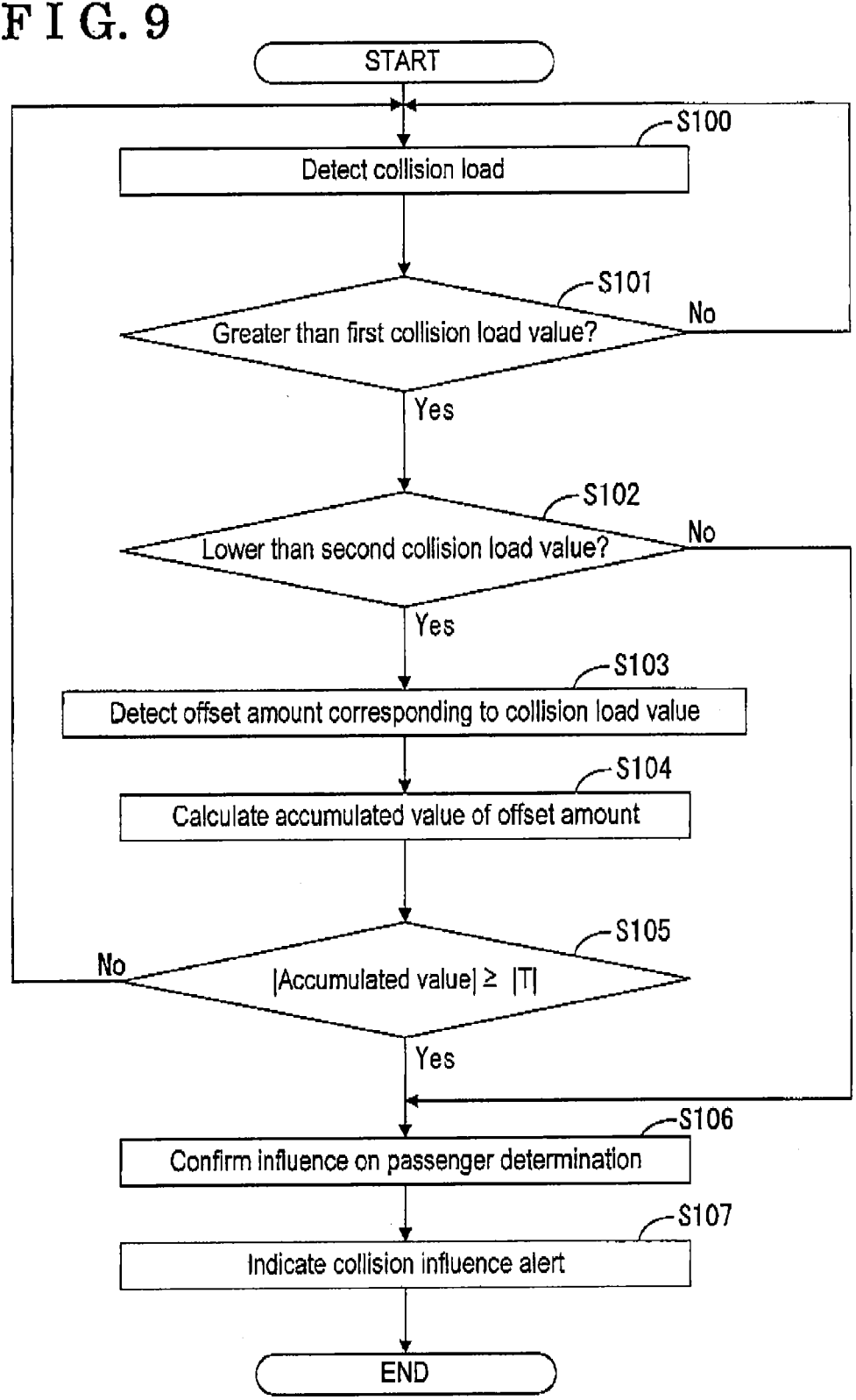
FIG. 9 is a flowchart showing a determination process for determining an influence on a passenger determination performance in accordance with an accumulated value of the offset amounts of the load value from zero.

Next, according to the above-configured seat apparatus 100 for the vehicle, an existence of an influence on the passenger determination performance of the load detection device 10 by the collision of the vehicle M will be explained with reference to the following determination process based on a flowchart shown in FIG. 9.

For example, in a case where the rear load sensor 21R placed at the rear of the seat 1 (seat cushion) for the vehicle detects the collision load (a negative value is detected) in the detachment direction of the attachment members (upper rail 14L and lower rail 41L) and the fixing member (the seat frame 111) at the time of the front collision of the vehicle (step S100), the program proceeds to step S101 and the control device 30 determines whether the detected collision load value is greater than the first collision load value Lth1 (step S101). Because the detected collision load value is indicated with a positive value or a negative value, or with a plus or a minus sign in accordance with a direction to which the load is applied, the detected collision load value is basically determined using an absolute value. Hereinafter, any detected collision load values in the embodiment will be determined using the absolute values. The rear load sensor 21R detects the negative load value in the detachment direction of the attachment members (upper rail 14L and lower rail 41L) and the fixing member (the seat frame 111) as a collision load in the case of the front collision of the vehicle M. The front sensor 21F detects the negative load value in the detachment direction of the attachment members (upper rail 14L and lower rail 41L) and the fixing member (the seat frame 111) as a collision load in the case of the rear collision of the vehicle M. Data of the first collision load value Lth1 is prestored in the memory portion 46 of the control device 30 as a first threshold value of the collision load value which may influence on the passenger determination performance of the load detection device 10. According to the embodiment, for example, a collision load value Lra is detected as the collision load.

In the embodiment, the control device 30 determines that the detected collision load value Lra is greater than the first collision load value Lth1, and the program proceeds to step S102. In a case where the collision load value Lra is lower than the first collision load value Lth1, the program returns to step S100 and waits until a next collision load is detected.

In step S102, the control device 30 determines whether the detected collision load value is lower than the second collision load value Lth2. Data of the second collision load value Lth2 is prestored in the memory portion 46 of the control device 30 as a second threshold value of the collision load value which always influences the passenger determination performance of the load detection device 10.

Figure 8:
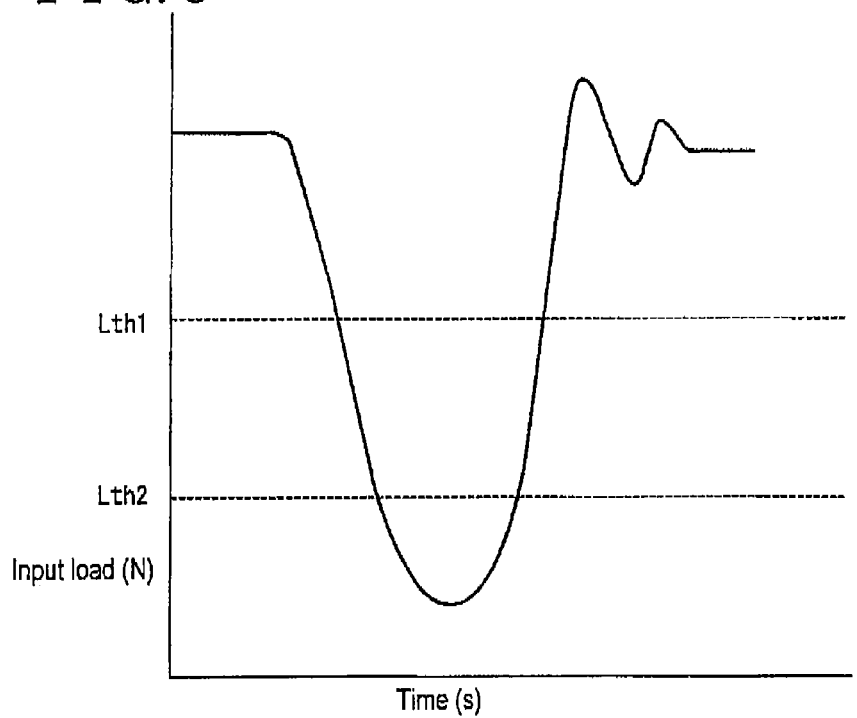
FIG. 8 is a graph showing an example of a detection of the collision load detected by the load detection device in the case of a normal collision.

In a case where the control device 30 determines that the detected collision load value is greater than the second collision load value Lth2, the program proceeds to step S106. For example, as shown in FIG. 8, the detected collision load value exceeding the second collision load value Lth2 in the first collision corresponds to a general collisional accident and influences on the passenger determination performance of the load detection device 10 in a single collision.

According to the embodiment, in step S102, in a case where the control device 30 determines that the detected collision load value Lra is lower than the second collision load value Lth2, the program proceeds to step S103.

In step S103, an offset amount Wra, which is the offset amount (i.e., the offset amount of the load value from zero), corresponding to the collision load value Lra of the rear load sensor 21R is detected based on the relationship between the collision load value and the offset amount shown, for example, in the map in FIG. 5. In those circumstances, the offset amount Wfa of the front load sensor 21F is obtained from the collision load value Lfa detected by the front load sensor 21F in a compression direction and is stored in the memory portion 46. The accumulated offset amounts and a predetermined threshold value −T are compared with each other on the basis of the obtained offset amount of the rear load sensor 21R. Because the offset amount of the front load sensor 21F is stored, the cumulative calculation of the offset amounts of the front load sensor may be performed simultaneously with the cumulative calculation of the offsets of the rear load sensor 21R.

Next, the program proceeds to step S104 and the offset amount obtained using the map is accumulated. When the detection is performed for the first time, the program proceeds to step S105 without accumulating the offset amount because there is no data to be accumulated.

Each of the front load sensor 21F and the rear load sensor 21R accumulates the offset amount. According to the embodiment, the offset amount Wra is accumulated when the detachment load is applied to the rear load sensor 21R. An offset amount Wfa, which is the offset amount (i.e., the offset amount of the load value from zero), is accumulated when the compression load is applied to the front load sensor 21F. The existence of the influence on the passenger determination performance is determined using the accumulated value of the rear load sensor 21R.

When a value between the first collision load value Lth1 and the second collision load value Lth2 is detected, the rear load sensor 21R generates the offset amount and detects and accumulates the detected value from and after this detection. However, the detected value detected as the collision load is assumed to be large so that an influence on an error of the measurement of the detected value may be approximately low even if the offset amount is generated.

In step S105, the absolute values of the accumulated value of, for example, the offset amount Wra and the predetermined threshold value −T are compared with each other and whether the accumulated value of, for example, the offset amount Wra is greater than the predetermined threshold value −T. In a case where the detection is performed for the first time, the offset amount Wra before accumulation is lower than the predetermined threshold value −T when comparing the absolute values of the offset amount Wra with the predetermined threshold value −T. Then, the program returns to step S100 and waits until the next collision load is detected.

Figure 7:
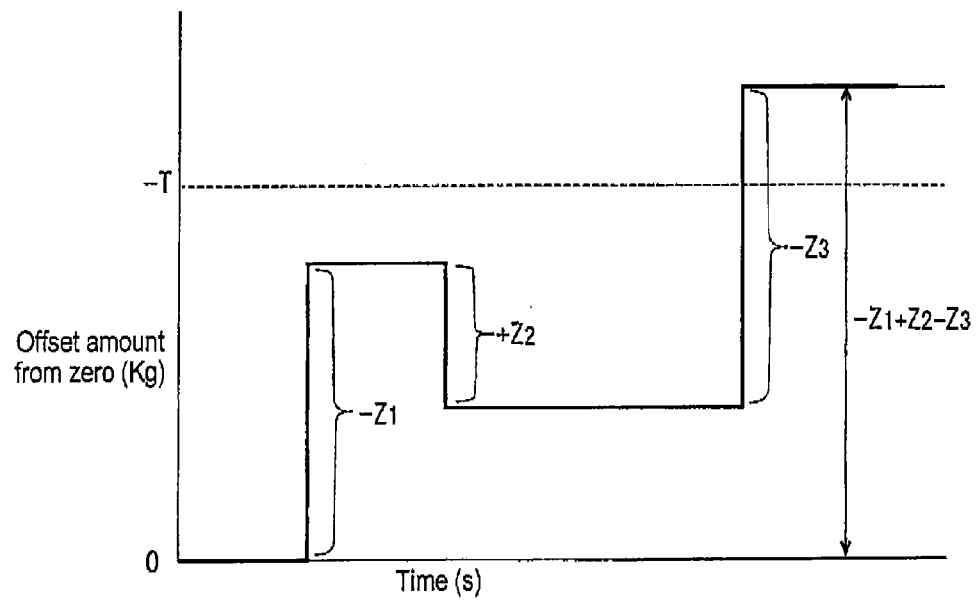
FIG. 7 is a graph showing a relationship between an accumulation of the offset amount of the load value from zero and a predetermined threshold value in the case of collisions for plural times.

In a case where the control device 30 determines that the accumulated value of the offset amounts is greater than the predetermined threshold value −T in step S105, the program proceeds to step S106. For example, in a case where the rear load sensor 21R stores an accumulated data, the offset amount shows a negative value in the case of the front collision and a positive value in the case of the rear collision as shown in FIG. 7. The offset amount corresponds to −Z1 (Wra) in the case of the front collision as the first collision of the vehicle M (see FIG. 5). The offset amount corresponds to +Z2 (Wrb) in the case of the rear collision as the second collision (see FIG. 6). The second collision is the case where the rear collision with the collision load value Lfa. The front load sensor 21F obtains the offset amount Wfb and the rear load sensor 21R detects, for example, the compression load Lrb. The offset amount corresponding to the compression load Lrb corresponds to the offset amount Wrb. Thus, the offset amount Wrb serves as the offset amount of the rear load sensor 21R, The offset amount corresponds to −Z3 (Wrc) in the case of the front collision as the third collision (see FIG. 5). Accordingly, the offset amounts in the first, second and third collisions are accumulated. The accumulated value of the rear load sensor 21R is obtained by calculating a formula of −Z1+Z2−Z3, which is greater than the predetermined threshold value −T when comparing the absolute values of the accumulated value with the predetermined threshold value −T (see FIG. 7). Thus, the program proceeds to step S106. Similarly, the front load detection sensor 21F accumulates the offset amounts and the control device 30 determines whether the threshold value of the accumulated value is greater than the absolute value of the predetermined threshold value −T. In a case where one of the rear load sensor 21R and the front load sensor 21F obtains the accumulated offset amounts which is greater than the predetermined threshold value −T, the program proceeds to step S106.

In step S106, the control device 30 defines that the collision of the vehicle M influences on the passenger determination performance of the load detection device 10.

In the following step S107, the indicator 52 indicates an collision influence alert and urges a passenger to have a vehicle check-up.

As is clear from the aforementioned explanation, according to the seat apparatus 100 for the vehicle of the embodiment, in a case where a detected value between the first collision load value Lth1 and the second collision load value Lth2 which are predetermined by the load detection device 10 is detected in the case of the collision of the vehicle M, the detection influence determination portion 50 determines the existence of the influence on the passenger determination performance of the load detection device 10 due to the collision of the vehicle M.

Because the detection influence determination portion 50 determines the existence of the influence on the passenger determination performance, the alert is not given in the case of the minor collision which does not influence on the passenger determination performance of the load detection device 10. Thus, an operator of the vehicle M does not have to take time and labor to ask a dealer or a maintenance shop for the vehicle check-up regardless of a degree of the collision. In the case of the collision which influences on the passenger determination performance of the load detection device 10, the alert is given to indicate the influence on the passenger determination performance due to the collision of the vehicle M. Accordingly, the load detection device 10 may prevent the decrease in the accuracy of the passenger determination performance due to the offset amount.

Generally, the load detection device 10 detects the weight of a passenger by the load in the compression direction where the lower rail 14L and the seat frame 111 come close to each other. Thus, because the value between the first collision load value Lth 1 and the second collision load value Lth2 which correspond to the collision load in the detachment direction of the attachment members (upper rail 14L and lower rail 41L) and the fixing member (the seat frame 111) is detected, the value can be detected clearly, easily and precisely as the collision load.

The offset amount is obtained from the relationship between the collision load stored in the memory portion 46 and the offset amount (i.e., the offset amount of the load value from zero detected by the load detection device 10). Then, it is not determined that the collision of the vehicle M influences on the passenger determination performance until the accumulated value of the obtained offset amounts exceed the predetermined threshold value −T.

As above, the load detection device 10 detects the offset amount which influences on the passenger determination performance and the offset amount is obtained from the relationship between the collision load value stored in the memory portion 46 and the offset amount. Accordingly, the influence on the passenger determination performance may be determined easily and precisely. Because the offset amount is accumulated for determination, the influence on the passenger determination performance may be determined further precisely because an influence on the passenger determination performance in the case of the repeated minor collision of the vehicle M and an influence on the passenger determination performance in the case of the repeated collision of the vehicle M in the different direction can be determined.

According to the embodiment, each of the front load sensor 21F and the rear load sensor 21R obtains and accumulates the offset amount in order to determine the influence on the passenger determination performance by comparing each of the front and rear load sensors 21F, 21R with the predetermined threshold value −T, however, is not limited to this. For example, the relationship between the collision load value detected by the load detection sensor 10 and total offset amounts of front and rear load values obtained by front and rear load sensors 21F, 21R can be stored in the correspondent relationship memory portion 49. Then, in a case where the collision load is detected, the total offset amount of front and rear load values obtained by front and rear load sensors 21F, 21R can be used to obtain the offset amount. In those circumstances, the total offset amount of front and rear load values obtained by front and rear load sensors 21F, 21R serve as the offset amount of the load value from zero detected by the whole load detection device 10 in the front-rear direction.

Next, a second embodiment of the load detection device 10 detecting the load of a passenger seated in the seat 1 of the seat apparatus 100 for the vehicle will be explained with reference to FIGS. 10 and 11.

Figure 10:
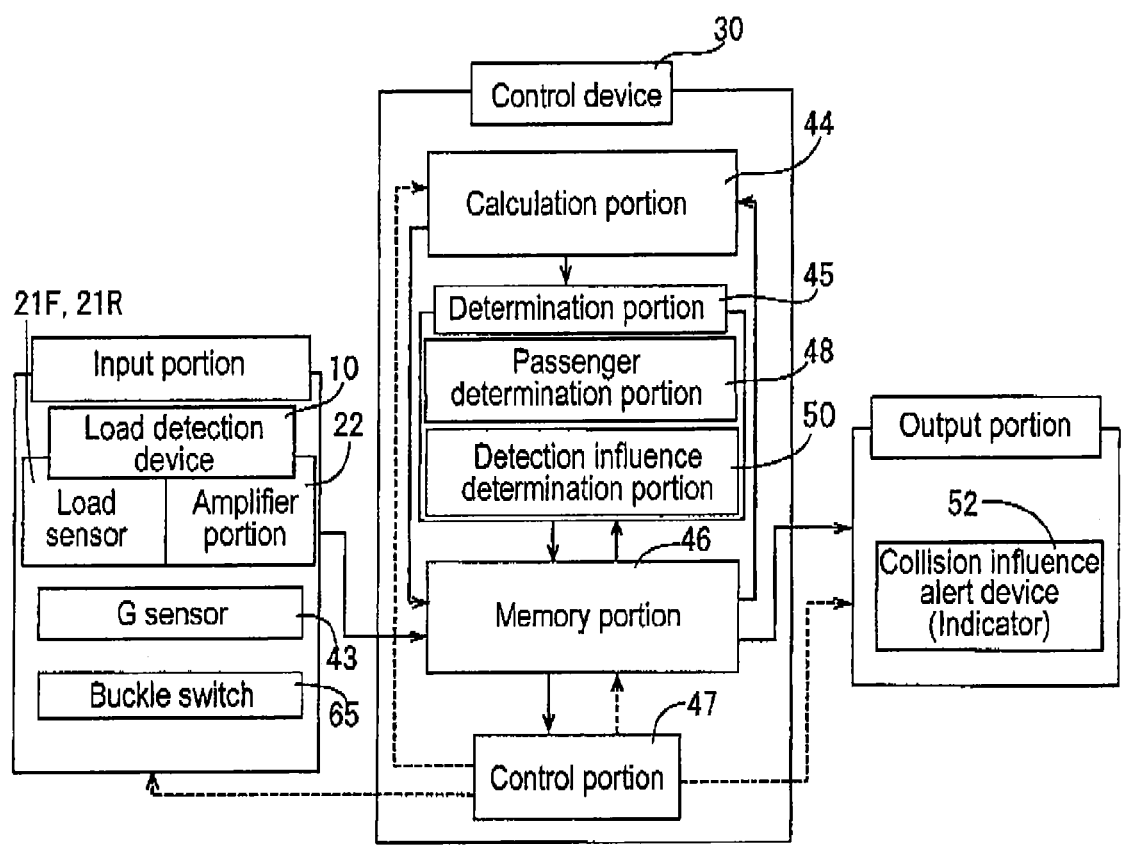
FIG. 10 is a block diagram schematically showing a control system according to a second embodiment.
Figure 11:
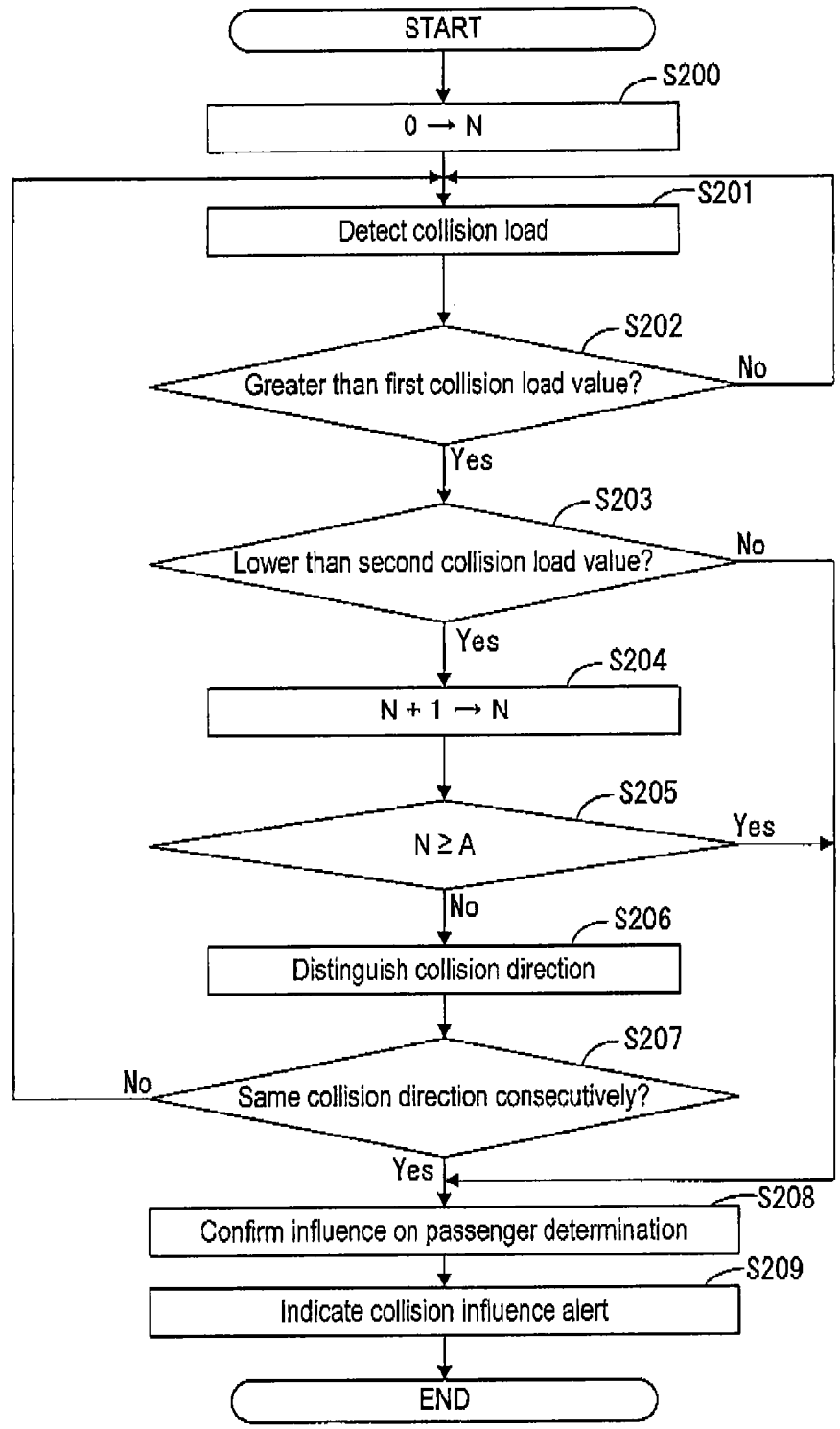
FIG. 11 is a flowchart showing a determination process for determining an influence on the passenger determination performance in accordance with a number of times of detection of predetermined detected values and a collision direction according to the second embodiment.

According to the second embodiment, as shown in FIG. 10, the seat apparatus 100 for the vehicle does not include the accumulated offset amount calculation portion 51 in the calculation portion 44 and the correspondent relationship memory portion 49 in the memory portion 46, which are different from the first embodiment. Further, according to the second embodiment, the detection influence determination device is configured with, for example, the detection influence determination portion 50, the calculation portion 44 and the memory portion 46. Because the configuration of the second embodiment which is not described above is the same or the substantially the same as the first embodiment, the same components as those described in the first embodiment are marked with the same reference numerals, and description of the components will not be repeated. According to the second embodiment, the existence of the influence on the passenger determination performance of the load detection device 10 is determined by the number of times of the determination of the collision load, which is different from the first embodiment. The second embodiment will be explained with reference to a flowchart in FIG. 11.

Upon starting a control for determining the existence of the influence on the passenger determination performance, the control device 30 stores a detected number of times N of the collision load to be detected as zero (step S200).

Next, similarly to the first embodiment, in a case where one of the rear load sensor 21R placed at the rear of the seat 1 (seat cushion) and the front load sensor 21F placed at the front of the seat 1 (step S201) detects the collision load in the detachment direction of the attachment members (upper rail 14L and lower rail 41L) and the fixing member (the seat frame 111) in the case of the front or rear collision of the vehicle M, the program proceeds to step S202. In step S202, the control device 30 determines whether the detected load value is greater than the first collision load value Lth1. According to the second embodiment, similarly to the first embodiment, the detected collision load value is basically determined using the absolute value. Hereinafter, any detected collision load values in the second embodiment will be determined using the absolute values.

In a case where the control device 30 determines that the detected collision load is greater than the first collision load value Lth1, the program proceeds to step S203. In a case where the detected collision load is lower than the first collision load value Lth1, the program returns to step S201 and waits until a next collision load is detected.

In step S203, the control device 30 determines whether the detected collision load value is lower than the second collision load value Lth2.

In step S203, in a state where the control device 30 determines that the detected collision load value is greater than the second collision load value Lth2, the program proceeds to step S208.

In step S203, in a state where the control device 30 determines that the detected collision load value is lower than the second collision load value Lth2, the program proceeds to step S204. In step S204, N is incremented by 1 and stored in the memory portion 46 as the detected number of times N of the collision load.

Next, in step S205, the control device 30 determines whether the detection number of times N of the collision load value exceeds the predetermined detected number of times A. For example, three which corresponds to a predetermined detected number of times A is prestored as data in the memory portion 46 of the control device 30.

In a case where the control device 30 determines that the detected number of times is greater than the predetermined detected number of times A, the program proceeds to step S 208 and the control device 30 defines that the collisions of the vehicle M influences on the passenger determination performance of the load detection device 10.

In a case where the control device 30 determines that the detected number of times N is lower than the predetermined detected number of times A in step S205, the program proceeds to step S206 and the control device 30 distinguishes the detected collision directions. Then, the program proceeds to step S207 and determines whether the collisions of the vehicle M in the same direction are detected consecutively. In a case where the collisions of the vehicle M in the same direction are not detected consecutively, the program returns to step S201 and waits until a next collision load is detected.

In a case where the collisions of the vehicle M in the same direction are detected consecutively, the program proceeds to step S208 and the control device 30 defines that the collision of the vehicle M influences on the passenger determination performance of the load detection device 10. FIG. 12 shows a case a, case b, and case d as examples of cases of the collisions in the same direction consecutively. In those circumstances, the detected number of times of the case a and case d corresponds to 2, respectively, however, it is determined that the collisions of the vehicle influence on the passenger determination performance because of the collisions in the same direction consecutively.

In the following step S209, the indicator 52 urges a passenger to have a vehicle check-up by indicating the collision influence alert.

As is clear from the aforementioned explanation, according to the seat apparatus 100 for the vehicle of the second embodiment, the number of times where the detected value between the first collision load value Lth1 and the second collision load value Lth2 is detected is obtained previously as a predetermined detected number of times A which influences on the passenger determination performance. In a case where the detected number of times N of the collision load detected by the load detection device 10 exceeds the predetermined detected number of times A, it is determined that the passenger determination performance is influenced. As above, by comparing the detected number of times N of the detected value between the first collision load value Lth1 and the second collision load value Lth2 detected by the load detection device 10 and the predetermined detected number A which influences on the passenger determination performance, the existence of the influence on the passenger determination performance may be determined promptly and easily.

The offset amount (i.e., the offset amount of the load value from zero) shows a positive value or a negative value in accordance with the direction to which the collision load is applied. Considering the accumulation of the offset amounts, for example, the accumulated value comes to be low because the positive value of the offset amount and the negative value of the offset amount counteract with each other in the case of the front and rear collisions of the vehicle M alternately. In a case where one of the front and rear collisions of the vehicle is detected consecutively, the accumulated value of the offset amounts comes to be large, leading to increase the possibility of the existence of the influence on the passenger determination performance. Accordingly, the control device 30 distinguishes the cases of the front and rear collisions which apply force to the load detection device 10 in the reverse directions at the time of the collision of the vehicle M. Accordingly, in a case where the detected values between the first collision load value Lth1 and the second collision load value Lth2 at the time of the collision of the vehicle M are detected in the same direction consecutively in addition to the detected number of times of the detected value between the first collision load value Lth1 and the second collision load value Lth2, the existence of the influence on the passenger determination performance may be determined. Thus, the existence of the influence on the passenger determination performance can be determined further precisely.

The first collision load value Lth1 and the second collision load value Lth2 may be set appropriately by an examination or an experiment in accordance with the performance of the vehicle or of the load detection device 10.

According to the second embodiment, the predetermined detected number of times corresponds to 3, however, is not limited to this. For example, the predetermined detection number of times may be set appropriately, for example, four times or five times, by an examination or an experiment in accordance with the performance of the vehicle, or of the load detection device 10.

According to the first and second embodiments, the front load sensor 21F and the rear load sensor 21R are placed to be spaced apart from each other in the front-rear direction of a left portion of the passenger seat of the vehicle, which is a center side of the vehicle, with left-hand steering wheel. Alternatively, the front load sensor and the rear load sensor can be placed to be spaced apart from each other in the front-rear direction of a right portion of the passenger seat of the vehicle, which is the center side of the vehicle, with right-hand steering wheel. The front load sensor and the rear load sensor may be placed to be spaced apart from each other in the front-rear direction of the outer side (window side) of the passenger seat.

According to the first and second embodiments, the front load sensor 21F and the rear load sensor 21R may be placed to be spaced apart from each other in the front-rear direction of one side of the seat 1, however is not limited to this. For example, the load sensors may be placed at two positions of the rear portion of the seat 1.

According to the first and second embodiments, the collision influence alert device corresponds to an indicator that indicates a passenger that the collision load which influences the passenger determination performance is detected, however is not limited to this. Alternatively, for example, the collision influence alert device may terminate the activation of the airbag and indicate that the airbag is in an inoperable state.

According to the first and second embodiments, the detected collision load corresponds to the detected load of the load detection device 10 in the detachment direction of the attachment members (upper rail 14L and lower rail 41L) and the fixing member (the seat frame 111), however, is not limited to this. For example, the detected collision load may correspond to a detected load in the compression direction of the of the attachment members (upper rail 14L and lower rail 41L) and the fixing member (the seat frame 111), the direction where attachment members (upper rail 14L and lower rail 41L) and the fixing member (the seat frame 111) come close to each other.

Constructions of the aforementioned embodiments are not limited to the aforementioned embodiment and various modifications are applied as long as the modifications do not depart from the objective of the disclosure.

According to the aforementioned embodiment, the seat apparatus 100 for the vehicle includes the seat 1, the right-left pair of attachment members (upper rails 14L, 14R and lower rails 41L, 41R) configured to be provided on the floor (40) of the vehicle, the fixing member (seat frame 111) provided at the seat 1 to fix the seat 1 to the attachment members (upper rails 14L, 14R and lower rails 41L, 41R), the load detection device (load detection device 10, front load sensor 21F, rear load sensor 21R) interposed between the fixing member (seat frame 111) and the attachment members (upper rails 14L, 14R and lower rails 41L, 41R), the load detection device (load detection device 10, front load sensor 21F, rear load sensor 21R) placed at the front and the rear of one of the right-left pair of the attachment members (upper rails 14L, 14R and lower rails 41L, 41R) so as to be spaced apart from each other, the load detection device (load detection device 10, front load sensor 21F, rear bad sensor 21R) measuring the load applied to the seat 1 to distinguish the existence of a passenger and the type of a passenger, the detection influence determination device (calculation portion 44, memory portion 46, correspondent relationship memory portion 49, detection influence determination portion 50, accumulated offset amount calculation portion 51) determining the existence of the influence on the passenger determination performance of the load detection device (load detection device 10, front load sensor 21F, rear load sensor 21R) in a case where the collision load value detected by the load detection device (load detection device 10, front load sensor 21F, rear load sensor 21R) in the case of the collision of the vehicle corresponds to the detected value between the preset first collision load value Lth1 and the preset second collision load value Lth2, and the collision influence alert device (indicator 52) outputting the alert in a case where the detection influence determination device (calculation portion 44, memory portion 46, correspondent relationship memory portion 49, detection influence determination portion 50, accumulated offset amount calculation portion 51) determines that the passenger determination performance is influenced, and the collision influence alert device (indicator 52) not outputting the alert in a case where the detection influence determination device (calculation portion 44, memory portion 46, correspondent relationship memory portion 49, detection influence determination portion 50, accumulated offset amount calculation portion 51) determines that the passenger determination performance is not influenced.

According to the aforementioned configuration, in a case where the detected value between the predetermined first collision load value Lth1 and the predetermined second collision load value Lth2 is detected as the collision load value detected when the vehicle M is collided, the detection influence determination portion 50 determines the existence of the influence on the passenger determination performance of the load detection device 10 caused by the collision of the vehicle.

Because the detection influence determination portion 50 determines the existence of the influence on the passenger determination performance, the alert is not given in the case of the minor collision which does not influence on the passenger determination performance of the load detection device 10. Thus, an operator of the vehicle M does not have to take time and labor to ask a dealer or a maintenance shop for the vehicle check-up regardless of a degree of the collision. In the case of the collision which influences on the passenger determination performance of the load detection device 10, the alert is given to indicate the influence on the passenger determination performance due to the collision of the vehicle M.

According to the aforementioned embodiment, the detection influence determination device (calculation portion 44, memory portion 46, correspondent relationship memory portion 49, detection influence determination portion 50, accumulated offset amount calculation portion 51) determines the existence of the influence on the passenger determination performance of the load detection device (load detection device 10, front load sensor 21F, rear load sensor 21R) in a case where the detected value between the first collision load value Lth1 and the second collision load value Lth2 corresponds to the detaching load applied in the detachment direction, the detachment direction corresponding to the direction where the attachment member (upper rails 14L, 14R and lower rails 41L, 41R) and the fixing member (seat frame 111) are separated from each other.

Generally, the load detection device 10 detects the weight of a passenger by the load in the compression direction where the lower rail 14L and the seat frame 111 come close to each other. Thus, because the value between the first collision load value Lth1 and the second collision load value Lth2 which correspond to the collision load in the detachment direction of the attachment members (upper rail 14L and lower rail 41L) and the fixing member (the seat frame 111) is detected, the value can be detected clearly, easily and precisely as the collision load.

According to the aforementioned embodiment, the detection influence determination device (calculation portion 44, memory portion 46, correspondent relationship memory portion 49, detection influence determination portion 50, accumulated offset amount calculation portion 51) includes the correspondent relationship memory portion 49 previously obtaining the relationship between the collision load value at the time of the collision of the vehicle and the offset amount Wra, Wrb, Wrc, −Z1, +Z2, −Z3 of the load value from zero detected by the load detection device (load detection device 10, front load sensor 21F, rear load sensor 21R), the correspondent relationship memory portion (49) storing the offset amount (Wra, Wrb, Wrc, −Z1, +Z2, −Z3) of the load value from zero (load detection device 10, front load sensor 21F, rear load sensor 21R), and the accumulated offset amount calculation portion 51 obtaining the offset amount Wra, Wrb, Wrc, −Z1, +Z2, −Z3 of the load value from zero which corresponds to the collision load value detected at the time of the collision from the correspondent relationship memory portion 49, the accumulated offset amount calculation portion 51 accumulating the obtained offset amount from zero everytime the vehicle has the collision. The detection influence determination device (calculation portion 44, memory portion 46, correspondent relationship memory portion 49, detection influence determination portion 50, accumulated offset amount calculation portion 51) determines that the passenger determination performance is influenced in a case where the offset amounts of the load value from zero accumulated in the accumulated offset calculation portion 51 exceed the predetermined threshold value −T.

The offset amount (i.e., the offset amount of the load value from zero) is obtained from the relationship between the collision load stored in the memory portion 46 and the offset amount (i.e., the offset amount of the load value from zero detected by the load detection device 10). Then, it is not determined that the collision of the vehicle M influences on the passenger determination performance until the accumulated value of the obtained offset amounts exceed the predetermined threshold value −T.

As above, the load detection device 10 detects the offset amount which influences on the passenger determination performance and the offset amount is obtained from the relationship between the collision load value stored in the memory portion 46 and the offset amount. Accordingly, the influence on the passenger determination performance may be determined easily and precisely. Because the offset amount is accumulated for determination, the influence on the passenger determination performance may be determined further precisely because an influence on the passenger determination performance in the case of the repeated minor collision of the vehicle M and an influence on the passenger determination performance in the case of the repeated collision of the vehicle M in the different direction can be determined.

According to the aforementioned embodiment, the detection influence determination device (calculation portion 44, memory portion 46, detection influence determination portion 50) determines that the passenger determination performance is influenced in a case where the number of times of a detection of the collision load value between the first collision load value Lth1 and the second collision load value Lth2 detected by the load detection device (load detection device 10, front load sensor 21F, rear load sensor 21R) due to the collision of the vehicle exceeds the predetermined detected number of times A.

As is clear from the aforementioned explanation, according to the seat apparatus 100 for the vehicle of the second embodiment, the number of times where the detected value between the first collision load value Lth1 and the second collision load value Lth2 is detected is obtained previously as a predetermined detected number of times A which influences on the passenger determination performance. In a case where the detected number of times N of the collision load detected by the load detection device 10 exceeds the predetermined detected number of times A, it is determined that the passenger determination performance is influenced. As above, by comparing the detected number of times N of the detected value between the first collision load value Lth1 and the second collision load value Lth2 detected by the load detection device 10 and the predetermined detected number A which influences on the passenger determination performance, the existence of the influence on the passenger determination performance may be determined promptly and easily.

According to the aforementioned embodiment, the detected value between the first collision load value Lth1 and the second collision load value Lth2 is distinguished into the front collision of the vehicle and the rear collision of the vehicle. It is determined that the passenger determination performance is influenced in a case where one of the front collision of the vehicle and the rear collision of the vehicle is detected consecutively.

The offset amount shows a positive value or a negative value in accordance with the direction to which the collision load is applied. Considering the accumulation of the offset amount, for example, the accumulated value comes to be low because the positive value of the offset amount and the negative value of the offset amount counteract with each other in the case of the front and rear collisions of the vehicle M alternately. In a case where one of the front and rear collisions of the vehicle is detected consecutively, the accumulated value of the offset amounts comes to be large, leading to increase the possibility of the existence of the influence on the passenger determination performance. Accordingly, the control device 30 distinguishes the cases of the front and rear collisions which apply force to the load detection device 10 in the reverse directions at the time of the collision of the vehicle M. Accordingly, in a case where the detected values between the first collision load value Lth1 and the second collision load value Lth2 at the time of the collision of the vehicle M are detected in the same direction consecutively in addition to the detected number of times of the detected value between the first collision load value Lth1 and the second collision load value Lth2, the existence of the influence on the passenger determination performance may be determined. Thus, the existence of the influence on the passenger determination performance can be determined further precisely.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
   a seat;
   a right-left pair of attachment members configured to be provided on a floor of the vehicle;
   a fixing member provided at the seat to fix the seat to the attachment members;
   a load detection device interposed between the fixing member and the attachment members, the load detection device placed at a front and a rear of one of the right-left pair of the attachment members so as to be spaced apart from each other, the load detection device measuring a load applied to the seat to distinguish an existence of a passenger and a type of a passenger;
   a detection influence determination device determining an existence of an influence on a passenger determination performance of the load detection device in a case where a collision load value detected by the load detection device in the case of a collision of the vehicle corresponds to a detected value between a preset first collision load value and a preset second collision load value; and
   a collision influence alert device outputting an alert in a case where the detection influence determination device determines that the passenger determination performance is influenced, and the collision influence alert device not outputting the alert in a case where the detection influence determination device determines that the passenger determination performance is not influenced.

2. The seat apparatus for the vehicle according to claim 1, wherein the detection influence determination device determines the existence of the influence on the passenger determination performance of the load detection device in a case where the detected value between the first collision load value and the second collision load value corresponds to a detaching load applied in a detachment direction, the detachment direction corresponding to a direction where the attachment member and the fixing member are separated from each other.

3. The seat apparatus for the vehicle according to claim 1, wherein the detection influence determination device includes:
   a correspondent relationship memory portion previously obtaining a relationship between the collision load value at a time of the collision of the vehicle and an offset amount of a load value from zero detected by the load detection device, the correspondent relationship memory portion storing the offset amount of the load value from zero; and
   an accumulated offset amount calculation portion obtaining the offset amount of the load value from zero which corresponds to the collision load value detected at the time of the collision from the correspondent relationship memory portion, the accumulated offset amount calculation portion accumulating the obtained offset amount from zero everytime the vehicle has the collision; wherein
   the detection influence determination device determines that the passenger determination performance is influenced in a case where the offset amounts of the load value from zero accumulated in the accumulated offset calculation portion exceed a predetermined threshold value.

4. The seat apparatus for the vehicle according to claim 2, wherein the detection influence determination device includes:
   a correspondent relationship memory portion previously obtaining a relationship between the collision load value at a time of the collision of the vehicle and an offset amount of a load value from zero detected by the load detection device, the correspondent relationship memory portion storing the offset amount of the load value from zero; and
   an accumulated offset amount calculation portion obtaining the offset amount of the load value from zero which corresponds to the collision load value detected at the time of the collision from the correspondent relationship memory portion, the accumulated offset amount calculation portion accumulating the obtained offset amount from zero everytime the vehicle has the collision; wherein
   the detection influence determination device determines that the passenger determination performance is influenced in a case where the offset amounts of the load value from zero accumulated in the accumulated offset calculation portion exceed a predetermined threshold value.

5. The seat apparatus for the vehicle according to claim 1, wherein the detection influence determination device determines that the passenger determination performance is influenced in a case where a number of times of a detection of the collision load value between the first collision load value and the second collision load value detected by the load detection device due to the collision of the vehicle exceeds a predetermined detected number of times.

6. The seat apparatus for the vehicle according to claim 2, wherein the detection influence determination device determines that the passenger determination performance is influenced in a case where a number of times of a detection of the collision load value between the first collision load value and the second collision load value detected by the load detection device due to the collision of the vehicle exceeds a predetermined detected number of times.

7. The seat apparatus for the vehicle according to claim 5, wherein the detected value between the first collision load value and the second collision load value is distinguished into a front collision of the vehicle and a rear collision of the vehicle; and it is determined that the passenger determination performance is influenced in a case where one of the front collision of the vehicle and the rear collision of the vehicle is detected consecutively.

8. The seat apparatus for the vehicle according to claim 6, wherein the detected value between the first collision load value and the second collision load value is distinguished into a front collision of the vehicle and a rear collision of the vehicle; and it is determined that the passenger determination performance is influenced in a case where one of the front collision of the vehicle and the rear collision of the vehicle is detected consecutively.

* * * * *